June 7, 1966   H. S. BLOCH ETAL   3,254,966
MEANS FOR EFFECTING CATALYTIC CONVERSION OF EXHAUST GAS STREAMS
Filed June 8, 1962
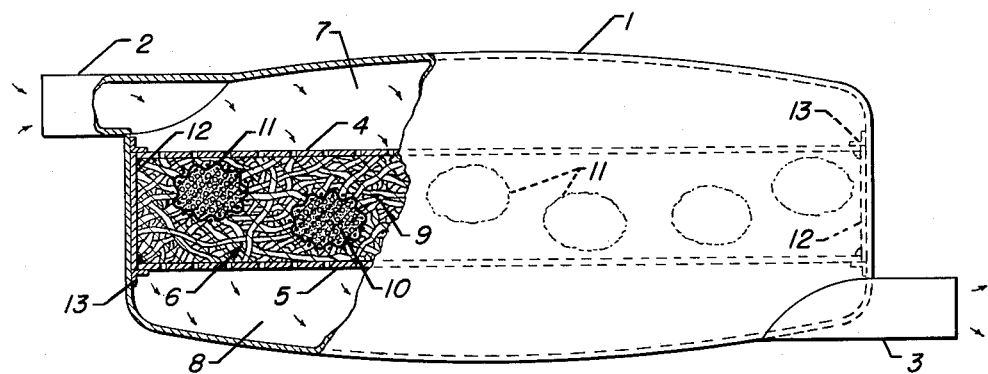
INVENTORS:
Herman S. Bloch
Vladimir Haensel
BY: James R. Hoatson Jr.
Philip T. Liggett
ATTORNEYS

United States Patent Office 3,254,966
Patented June 7, 1966

3,254,966
MEANS FOR EFFECTING CATALYTIC CONVERSION OF EXHAUST GAS STREAMS
Herman S. Bloch, Skokie, and Vladimir Haensel, Hinsdale, Ill., assignors to Universal Oil Products Company, Des Plaines, Ill., a corporation of Delaware
Filed June 8, 1962, Ser. No. 201,037
5 Claims. (Cl. 23—288)

The present invention provides improved means for effecting the catalytic conversion of waste gas streams and more specifically an improved catalytic bed arrangement which utilizes a major proportion of a catalytically coated and durable high temperature resistant metal alloy material and a minor proportion of spaced pockets or zones of low ignition temperature catalyst particles comprising catalytically impregnated refractory inorganic oxide base material.

Waste products from various sources are discharged into the atmosphere and, unless such waste products are oxidized or treated to remove deleterious components, the waste products may contaminate the atmosphere. A specific example is in the case of exhaust products of automotive engines. Such waste products contain one or more components as unburned hydrocarbons, carbon monoxide, nitrogen oxides, sulfur compounds, partially oxidized products, etc., in various concentrations, and part or all of these are believed to contribute to the smog problem presently facing various geographical areas of the United States and other countries.

Other examples of discharge of waste products into the atmosphere include those emitting from stationary engines and from various industrial operations, as for example, the printing industry, tanning industry, chemical plants, and the like. Various coating and drying processes, such as the drying of varnish and enamel coatings on wire and other metal products, give rise to the discharge of large quantities of volatile solvents and drying oils which require combustion prior to being discharged to the atmosphere. Regardless of the source of the waste product stream, the present invention provides an improved catalyst bed and means for treating the waste product streams to decrease the deleterious effect which otherwise may be encountered by discharging such products into the atmosphere.

One of the handicaps encountered in the utilization of catalytic converters for effecting the catalytic oxidation of an obnoxious waste gas stream is the necessity for achieving a low-ignition temperature. In oxidizing volatile components from various drying operations or for oxidizing obnoxious gases from various treating operations, it is frequently necessary to utilize auxiliary burners in the flow path of the waste gas stream to insure bringing such stream up to an oxidation temperature whereby the catalytic bed may take over and complete the oxidation of entrained combustible components. Also in connection with the catalytic oxidation of automotive exhaust gases there may be a lag in effecting catalytic oxidation of the carbon monoxide and hydrocarbon components in the exhaust gas stream. In other words, when an automobile is started and used from a cold start then for a period of from two to perhaps ten minutes, depending upon the manner of operating the automobile, the catalyst bed may remain relatively cool and be unable to burn the residual components effectively within the converter.

It has been found that catalytically coated alloy metal wire or ribbon utilized in a packed mat arrangement provides a high surface area catalytic element having an effective long life in many commercial installations for the catalytic oxidation of waste gas fumes. The wire or ribbon may be crimped and/or coiled in order to provide a large amount of surface area in a particular element and, in addition, maintained in a perforate type of casing such that one or more of such mats or elements may be readily handled for installation in duct work or an outlet stack, across the path of a discharge stream. Chrome-nickel stainless steel alloys, which are heat and electrically resistant materials, are preferably used as the base material for the metallic catalyst elements. There are many forms and compositions of stainless steel such as Chromel and Nichrome of various grades which may be electroplated or otherwise coated with a catalytically active metal coating such as platinum, palladium, or other platinum group metals, or a combination of two or more of the platinum group metals. Such metal catalysts are of advantage in that they have high temperature resistance, high thermal conductivity permitting heat of combustion to be transferred to all portions of the catalyst, ease of handling, high strength and a long life by reason of freedom from erosion and breakage. On the other hand, such types of all-metal catalysts have relatively high ignition temperatures such that the rate of flow of the cold gases may be so rapid that the relatively small amount of heat of combustion liberated per unit of time is dissipated in an exhaust gas stream, precluding heat storage by the catalytic material and any temperature build up in the bed. Only when the rate of evolution of heat by combustion exceeds the rate at which the heat is carried off is it possible for the temperature of the catalyst bed to be raised, resulting in what is called "ignition," or combustion at a self-sustaining rate. The ignition temperature will, of coures, vary in each installation depending upon the type of combustion components in the waste gas stream and the concentration of combustibles in the total stream, but generally ignition does not take place below about 750° F. when utilizing catalytically coated metal alloy elements in a typical fume incinerating installation. Many installations will not initiate combustion below still higher temperatures, say of the order of 1000° F. or higher, such that it is necessary to have an extraneous source of heat to initiate combustion. In connection with automobile exhaust streams, a converter-muffler utilizing catalytic material to oxidize carbon monoxide and hydrocarbons in the exhaust gas stream should have catalyst capable of initiating oxidation below about 500° F. and preferably below 400° F.

Experimental work has shown that various non-metallic catalysts comprising high surface area absorbent impregnated inorganic oxide base materials will provide highly active oxidation catalysts capable of being used for relatively long periods of time in the presence of a waste gas stream including automotive engine exhaust streams. For example, synthetically prepared alumina which is formed from an alumina gel in a manner to have a low bulk density and is impregnated with a small quantity of platinum, comprising less than about 0.1% by weight of the finished catalyst, will have a carbon monoxide ignition temperature less than 400° F. Also many non-noble metal components, particularly iron or an iron group metal, copper and chromium, either alone or in combination with other metal components, have shown that they may impart to catalysts desirable low ignition characteristics equivalent to or better than those of various catalysts which contain only platinum or other noble metal activating agents.

It is thus a principal object of the present invention to combine a high strength non-breakable metal catalyst with a minor proportion of spaced zones of a low ignition temperature high surface area absorbent type of catalyst.

It is a further object of the invention to utilize refractory spherical or pellet type of inorganic base catalytic particles in a plurality of confined, screened and spaced zones within a bed or mat of catalytically coated metal alloy material in a manner such that the low ignition temperature spaced pockets of catalyst are in direct contact and heat exchange relationship with the all-metal catalyst, whereby the latter will receive heat conducted or radiated from the low ignition temperature zones of active catalyst.

In one embodiment the present invention provides a method for oxidizing a combustible waste gas stream in a manner which comprises, passing such stream in admixture with air at an oxidation temperature through a composite metallic and non-metallic catalyst bed maintained in a conversion zone, with such bed containing a major proportion of packed catalytically coated metal alloy material and a minor proportion of low ignition temperature non-metallic catalyst particles comprising an inorganic oxide refractory base material having a catalytic coating which is impregnated with at least one catalytically active component selected from the group consisting of Groups IB, VIB and VIII of the periodic table of elements, with such catalyst particles being interspersed in spaced zones maintained in contact and heat exchange relationship with said coated metal alloy, and subsequently removing a treated waste gas stream from the conversion zone.

In another embodiment, the present invention provides an improved form of waste gas converter which comprises in combination, a confined housing, spaced perforate partitioning dividing the interior of the housing into a gas inlet section, a gas outlet section and a catalyst retaining section between the inlet and outlet sections, said catalyst retaining section having the interior thereof packed with a major portion of a mat of strand-like metallic catalytic material and a minor portion of spaced relatively small pockets of particulated catalyst having a lower ignition temperature than said major portion, and with said particulated catalyst being held in perforate encasement means in said pockets in said catalyst retaining section.

In still another embodiment the invention provides an improved catalytic element for use in converting a waste gas stream which comprises in combination, a perforate housing having at least two spaced parallel perforate faces, a mass of compacted thin alloy crimped ribbon having a catalytic coating of at least one platinum group metal thereon and filling the interior of said housing, and a plurality of spaced pockets of lower ignition temperature inorganic oxide base particles having at least one catalytically active component impregnated thereon, with such pockets of particles being contained within a confining perforate membrane, whereby such particles are retained within said spaced pockets in direct contact and heat exchange relationship with said coated alloy ribbon within said housing and are between said parallel perforate faces thereof.

It is not intended to limit the coated metal alloy catalytic base material to any one type of coating or one type of alloy inasmuch as such material may have various active coatings as well as various shapes or configurations and chrome-nickel compositions. In addition, various means of coating the base metal may be utilized in arriving at a desirable all-metal catalyst material; however, generally it has been found that high temperature resistant and erosion resistant electroplated coatings, particularly those which are subsequently etched, provide an active catalyst and a long life in severe commercial operations. Reference may be made to the Suter and Ruff Patent No. 2,720,494 issued October 11, 1955, which sets forth the preparation of one type of satisfactory metallic catalytic element.

For the non-metallic pockets of catalyst, any suitable carrier material may be employed and generally comprises a refractory metal oxide such as alumina, silica, silica-alumina, zirconia, silica-zirconia, alumina-zirconia, silica-alumina-zirconia, titania, silica-titania, alumina-titania, silica-alumina-titania, thoria, silica-thoria, alumina-thoria, silica-alumina-thoria, silica-alumina-zirconia-thoria, silica-alumina-zirconia-titania, magnesia, silica-magnesia, alumina-magnesia, silica-alumina-magnesia, zinc oxide alone or composited with one or more of the refractory metal oxides mentioned above, etc. The refractory metal oxides are naturally occurring or synthetically prepared in any suitable manner and may be utilized in the form of granules of uniform or irregular size and shape, spheres, pills, pellets, powders, etc.

Alumina or an alumina-magnesia composite is a particularly preferred carrier. The term alumina is used herein to include porous aluminum oxide in various states of hydration. Whatever type of alumina is employed, it may be activated prior to use by one or more treatments including drying, calcining, steaming, acid, etc. It may be in a form known as activated alumina, porous alumina, alumina gel, etc. The alumina may be prepared by adding a suitable alkaline reagent such as ammonium hydroxide to a salt of aluminum such as aluminum chloride, aluminum sulfate, aluminum nitrate, etc., in amount to form aluminum hydroxide which, upon drying, is converted to alumina. The alumina may be formed into any desired shape such as spheres, pills, extrudates, powder, granules, etc. A preferred form of alumina is the sphere, and alumina spheres may be continuously manufactured by passing droplets of an alumina sol into an oil bath maintained at an elevated temperature, retaining the droplets in the oil bath until they set to form hydrogel spheroids. The spheres are continuously withdrawn from the oil bath, and are then immediately subjected to aging treatments to impart the desired physical characteristics thereto. The alumina is then dried at a temperature of from about 100° F. to about 500° F. or more. In another embodiment the spray drying technique may be used in forming the refractory inorganic oxide carrier.

In still another embodiment the refractory metal oxide or oxides are prepared to have a low density which appears to be of advantage for use in the present invention. For example, alumina or silica-alumina spheres are prepared by the oil drop method in which the ratio of the reactants and method of preparation are controlled to form spheres having densities of below about 0.4 and preferably from about 0.15 to 0.35 gm./cc.

In regard to the activating catalytic component on the refractory base material it is not intended to limit the present low ignition composite to any one component or group of components inasmuch as experimental work has shown that various non-noble metal composites have ignition temperatures which are as low as, or lower than, the platinum containing catalysts. In one test procedure referred to as a "Carbon Monoxide (CO) Oxidation Test," there has been provided a means for screening catalysts to determine their activity to convert carbon monoxide and hydrocarbons. In this test, a gas consisting of 4% carbon monoxide, 3% oxygen and the remainder nitrogen is passed through a heating zone at a fixed rate of 5000 cc. per minute, containing a bed of 100 cc. in the catalyst sample. Spaced thermocouples are arranged in the bed and in the inlet to the bed to provide temperature readings during the test operation and thus provide means for determining an "ignition temperature" along with a "Delta T" temperature between the inlet and outlet of the zone after combustion is initiated. A low initial temperature is desired so that the reactions are initiated within a minimum of time after start up from cold conditions. A high Delta T is desirable inasmuch as it indicates the extent of the reaction. Preferred low ignition temperature catalysts within the scope of the present invention are those catalysts which initiate ignition at a low temperature below about 500° F. and which also have a high Delta T above about 400° F. Representative catalysts that provide said low ignition temperature characteristics and a high Delta T include the following:

|  | Temperature, °F. | |
|---|---|---|
|  | Ignition | Delta T |
| 0.1% Pt. on 1/8" Al₂O₃ Spheres | 435 | 545 |
| A physical mixture of 0.65% of 4% Pt. and 99.35% of 0.07% Pt. on 1/8" Al₂O₃ spheres | 360 | 530 |
| 10% Co-20% Fe on 1/8" Al₂O₃ spheres | 220 | 530 |
| 10% Cu-20% Fe on 1/8" Al₂O₃ spheres | 255 | 560 |
| 10% Cu-10% Cr on 1/8" Al₂O₃ spheres | 240 | 595 |
| 20% Co on 1/8" spheres of 15% Magnesia-85% Al₂O₃ | 270 | 470 |
| 10% Fe-0.1% Pt. on 1/8" Al₂O₃ Spheres | 300 | 560 |
| 20% Co-20% Fe on 1/8" Al₂O₃ Spheres | 190 | 565 |
| 20% Ni-12% Cu on 1/8" Al₂O₃ Spheres | 280 | 570 |

(The percentages of metal shown are percent, by weight, of the resulting composite.)

Actually, the catalytically active components, composited with the refractory inorganic oxide carrier material, may include metals selected from Groups IB, VIB and VIII of the periodic table, such as the following: chromium, molybdenum, tungsten, members of the iron-group and of the platinum group of metals, copper, silver and gold. A particular metal may be used in and of itself, or in combination with any of the foregoing metals. Thus, the catalyst to be employed for improving waste products, prior to discharge into the atmosphere, may comprise the following: platinum, palladium, other noble metals such as iridium, ruthenium and rhodium, iron, cobalt, nickel, copper, tungsten, molybdenum, silver, gold and various mixtures including platinum-iron, platinum-cobalt, platinum-nickel, palladium-iron, palladium-cobalt, palladium-nickel, platinum-palladium, palladium-copper-cobalt, platinum-cobalt-copper, copper-cobalt-nickel-platinum, platinum-palladium-cobalt, etc. It is understood that the catalytic activity, thermal stability, lead stability, auto-initiating temperature, and other characeristics of the catalyst of the present invention, are not necessarily equivalent. Many of the specific catalytic composites discussed herein do not necessarily yield equivalent results when compared with other catalyst composites composing one or more different metallic components.

Each catalytically active metallic component utilized in the preparation of the catalyst of the present invention, will be present within the range of about 0.01% to about 20.0% by weight thereof. Where the metal component is selected from the platinum-group, the same will be present in an amount within the range of about 0.05% to about 2.0% by weight thereof. The metallic components may be incorporated in any suitable manner. Thus, where platinum is employed, it may be added to the alumina carrier material by commingling the latter with an aqueous solution of chloroplatinic acid. Other water-soluble compounds of platinum, or of the other noble metal components, may be utilized within the impregnating solution, and include ammonium chloroplatinate, platinous chloride, platinic chloride, dinitrito-diaminoplatinum, etc. Where the catalyst is to contain other metallic components, such as those hereinbefore set forth, the catalyst may be prepared by commingling water-soluble compounds of these components, particularly the nitrates, sulfates, chlorates, acetates, chlorides, or carbonates, and soaking the particles of the inorganic refractory oxide therein followed by heating to form the corresponding oxides of the metallic components. Although the precise means by which the metallic component is combined with the refractory material is not known, it is believed that it exists in some physically adsorbed state or chemical complex therewith. Thus, platinum may be present as such, or as a chemical compound or in physical association with the refractory inorganic oxide, or in some combination with both.

Reference to the accompanying drawing will serve to show diagrammatically one embodiment which incorporates an improved composite of metallic non-metallic low ignition temperature absorbent type of catalyst bed in a converter-muffler form of housing such as may be suitably used in treating an exhaust gas stream from an automotive engine.

A suitable housing 1 is provided with an inlet port 2 and an outlet port 3 whereby a gas stream may be introduced to and discharged from the housing. Internally there is provided a pair of spaced perforate plates 4 and 5 which serve to form an internal catalyst containing section 6 and to divide the interior of chamber 1 into an inlet manifold section 7 and an outlet manifold section 8. The exhaust gas stream through port 2 is thus distributed by the manifold section 7 through perforate plate 4, the internal catalyst section and the lower perforate plate 5 to the outlet manifold section 8 for subsequent discharge through outlet port 3.

In accordance with the present invention, the catalyst section 6 contains a major proportion of a metallic ribbon, strips, or strand-like material 9 which have been catalytically coated with a catalytic metal such as platinum or a platinum group metal or composite of platinum group metals. A preferred construction utilizes a tightly compressed mat of crimped alloy ribbon catalytically coated with an electrodeposition of platinum and/or palladium. For example, 1/4-inch wide stainless steel ribbon of light gauge is crimped and coated to provide the catalyst 9 which in turn proivdes the major proportion of the catalyst packing within the catalyst section 6 of the unit.

Spaced transversely across the entire catalyst section 6 are small quantities of particulated catalyst 10 confined within enclosing mesh or perforate screen-like material 11. The particles 10, in accordance with the present invention, comprise spheres, pellets, or irregularly-shaped granules of a suitably prepared catalytically active refractory inorganic oxide base type of catalyst which has a low ignition temperature. Various catalytic composites of this type have been set forth and described hereinbefore and are within the scope of this invention referred to as "low ignition" catalysts. The enclosing membrane 11 may comprise a high temperature resistant alloy screen of small mesh size capable of containing the catalyst particles. Relatively rigid perforate spherical or rectangularly shaped containers, in lieu of the pliable screening 11, may be utilized to suitably retain the catalyst particles within a confined zone or pocket in catalyst section 6. Loose catalyst particles would work to the bottom of the converter, and it is, of course, necessary to have screening or perforations in the catalyst retaining means so as to permit the passage of the exhaust gas stream through the individual catalyst pockets.

The entire internal catalyst section 6 may be made removable from the converter unit by providing a peripheral wall member 12 that is attached to the upper and lower perforate plates 4 and 5. The catalyst element may be held in place by ring support members 13, rather than have the plates 4 and 5 directly joining with the inner wall of the chamber 1. The latter may also be provided with a removable side or cover portion such that the catalyst section 6 as a separate removable element may be taken out and replaced.

Upon the passage of an exhaust gas stream through the converter unit, the initial catalytic oxidation of the combustible components in the exhaust gases will take place in the low ignition temperature catalyst pockets 10 with a build up of temperature spreading therefrom into the adjacent metallic ribbon catalyst 9, such that the latter gradually initiates catalytic combustion of the combustible components in the exhaust gas stream. By virtue of the use of highly conductive all strand-like material for the metal catalyst there is a rapid temperature spread across the entire catalyst section 6 to cause the entire exhaust gas stream to be subjected to catalytic combustion and conversion as it passes through the converter. Without the use of the low ignition temperature pockets a converter may operate without substantial combustion for relatively long periods of time, say 15 minutes or more when used in connection with treating automobile engine exhaust streams, such that the over all efficiency will be relatively low. Particularly, there will be lower efficiency when there is frequent starting and stopping of the engine and the exhaust gas stream does not immediately reach a high temperature which will conduct heat to the converter to initiate rapid catalytic conversion of combustible components in the exhaust gas stream.

In connection with stationary engines, a modified design of the converter may be utilized in that pockets of low ignition temperature catalyst may be positioned in spaced locations with a minimum of retaining means, perhaps eliminating all or a portion of screen member 11 inasmuch as the converter will not be subjected to movement or intense jarring. In automobile muffler-converter installations, it is recognized that there will be considerable jarring and perhaps movement to a converter positioned in an exhaust gas line under an automobile body so that the catalyst particles are in turn subjected to attrition from jarring and crushing, as well as from erosion by the high temperature exhaust gas stream. Thus, in automotive installations it is desirable to utilize catalyst particles with relatively high crushing strength and maintain them in a suitable screen or mesh like container to preclude loss of particles from the spaced pockets thereof.

Further, it is not intended to limit the converter design or the exhaust gas flow through the converter to any one type of pattern such as indicated in the accompanying drawing inasmuch as cross flow arrangements, radial flow arrangements, or reversing flow arrangements may all be utilized to effect the desired efficient contact of the exhaust gas stream by the catalyst section. Also, where desirable, suitable insulation means may be used around or within the converter housing to minimize the loss of heat from the catalyst section, or to preclude a high heat transfer rate to the auto body or adjacent apparatus.

We claim as our invention:

1. A catalytic element for use in waste gas converters comprising a housing having spaced perforate walls, a compact mat of strand-like, all-metal catalytic material filling the interior of said housing, a plurality of relatively small perforate containers disposed in spaced relationship within said compact mat and surrounded by said all-metal catalytic material, and a filling of particulated catalyst of lower ignition temperature than said all-metal catalytic material disposed in each of said perforate containers.

2. The catalytic element of claim 1 further characterized in that said all metal catalytic material comprises a strand-like alloy metal base coated with at least one catalytically active metal.

3. The catalytic element of claim 1 further characterized in that said strand-like material comprises a thin alloy metal ribbon and said particulated catalyst comprises alumina spheres having a platinum metal group activating component impregnated thereon.

4. The catalytic element of claim 1 further characterized in that said particulated catalyst is a composite of an inorganic oxide base and an oxidizing catalytic component.

5. A catalytic element for use in waste gas converters comprising a housing having spaced perforate walls, a compact mat of high temperature resistant metal alloy ribbon coated with an oxidizing metal catalyst filling the interior of said housing, a plurality of relatively small perforate high temperature resistant alloy containers disposed in spaced relationship within and surrounded by said compact mat, and a filling of particulated catalyst disposed in each of said containers and comprising a composite of an inorganic base and an oxidizing catalytic component, said particulated catalyst having a lower ignition temperature than said coated alloy ribbon.

References Cited by the Examiner
UNITED STATES PATENTS

| | | | |
|---|---|---|---|
| 2,071,119 | 2/1937 | Harger | 23—2.2 |
| 3,050,375 | 8/1962 | Bloch | 23—2.2 |
| 3,068,079 | 12/1962 | Purse et al. | 23—2.2 |

BENJAMIN HENKIN, *Primary Examiner.*

MAURICE A. BRINDISI, *Examiner.*

E. C. THOMAS, *Assistant Examiner.*